(12) United States Patent
Uemura et al.

(10) Patent No.: US 7,780,770 B2
(45) Date of Patent: Aug. 24, 2010

(54) AIR CLEANER

(75) Inventors: Soichi Uemura, Hamamatsu (JP); Atsushi Suzuki, Hamamatsu (JP)

(73) Assignee: Toyo Roki Seizo Kabushiki Kaisha, Hamamatsu-Shi (JP)

( * ) Notice: Subject to any disclaimer, the term of this patent is extended or adjusted under 35 U.S.C. 154(b) by 219 days.

(21) Appl. No.: 11/945,280

(22) Filed: Nov. 27, 2007

(65) Prior Publication Data
US 2008/0134898 A1 Jun. 12, 2008

(30) Foreign Application Priority Data
Dec. 6, 2006 (JP) .............................. 2006-329885

(51) Int. Cl.
*B01D 53/02* (2006.01)
(52) U.S. Cl. .............................. 96/134; 96/135; 96/153; 96/154; 55/486; 55/492
(58) Field of Classification Search .................. 96/134, 96/135, 153, 154; 55/486, 492
See application file for complete search history.

(56) References Cited
U.S. PATENT DOCUMENTS
5,288,402 A * 2/1994 Yoshida ...................... 210/488
5,350,443 A * 9/1994 von Blucher et al. .......... 96/135
6,322,604 B1 * 11/2001 Midkiff ........................ 55/486
6,692,555 B2 2/2004 Oda et al.
7,063,733 B2 * 6/2006 Mori et al. ..................... 96/135
2002/0139746 A1 * 10/2002 Koslow .................... 210/493.1
2004/0031252 A1 * 2/2004 Heikamp ..................... 55/486
2007/0028573 A1 * 2/2007 Goto et al. ................... 55/486

FOREIGN PATENT DOCUMENTS
JP 2002-276486 9/2002

* cited by examiner

*Primary Examiner*—Robert J Hill, Jr.
*Assistant Examiner*—Christopher P Jones
(74) *Attorney, Agent, or Firm*—Young & Thompson

(57) ABSTRACT

An air cleaner particularly disposed for an internal combustion engine is provided with a housing, a filter element disposed in the housing, and adsorbent disposed on the side of an outlet formed to the housing and adapted to adsorb an evaporated fuel invaded inside the housing through the outlet. The adsorbent includes an adsorbing material adsorbing the evaporated fuel and a pair of non-woven fabrics sandwiching the adsorbent material from both sides thereof, and at least one of the non-woven fabrics disposed on the outlet side includes a reinforcing material so as to be integrated with the non-woven fabric.

3 Claims, 2 Drawing Sheets

AIR CLEANER

BACKGROUND OF THE INVENTION

1. Field of the Invention

The present invention relates to an air cleaner, particularly of an internal combustion engine, provided with an adsorbent adsorbing evaporated fuel existing in an intake unit of an internal combustion engine.

2. Related Art

In an intake unit of an internal combustion engine, in order to prevent an evaporated fuel returned from an engine side from discharging into atmosphere, an adsorbent adsorbing the evaporated fuel is disposed in an air cleaner of the internal combustion engine.

For example, in an air cleaner disclosed in Japanese Patent Unexamined Application Publication No. 2002-276486 (Patent Publication 1), an adsorbent composed of activated carbon is sandwiched by non-woven fabrics to thereby form an adsorbent filter, which is disposed inside a housing of the air cleaner.

In the invention disclosed in this Patent Publication 1, in order to protect such adsorbent from backfire, the filter is composed of a net-shaped material having heat-proof property and disposed on the engine side of the adsorbent.

Indeed, for the adsorbent in which the adsorbing material is sandwiched by the non-woven fabrics, there exists a subject of protecting the adsorbent from the backfire.

Further, there exists a problem of preventing the adsorbent from being damaged or bowed which will be caused by air-suction. However, in the invention disclosed in the Patent Publication 1, it is difficult to prevent the adsorbent from being damaged and bowed caused by the air-suction.

SUMMARY OF THE INVENTION

The present invention was conceived in consideration of the above circumstances encountered in the prior art and an object thereof is to provide an air cleaner capable of preventing an adsorbent from being damaged and bowed.

The above and other objects can be achieved according to the present invention by providing, in one aspect, an air cleaner comprising:

a housing having an inlet for ambient air is introduced into the housing therethrough and an outlet for a filtrated air is discharged out of the housing therethrough;

a filter element disposed in the housing so as to separate the inside thereof into an inlet side section and an outlet side section and configured to filtrate the ambient air introduced into the housing; and an adsorbent disposed on the side of the outlet from the filter element so as to oppose to the filter element and configured to adsorb an evaporated fuel invaded inside the housing through the outlet, wherein the adsorbent includes an adsorbing material adsorbing the evaporated fuel and a pair of non-woven fabrics sandwiching the adsorbent material from both sides thereof, and at least one of the non-woven fabrics disposed on the outlet side includes a reinforcing material so as to be integrated with the non-woven fabric.

In another aspect of the present invention, there is provided an air cleaner comprising:

a housing having an inlet for ambient air is introduced into the housing therethrough and an outlet for a filtrated air is discharged out of the housing therethrough;

a filter element disposed in the housing so as to separate the inside thereof into an inlet side section and an outlet side section and configured to filtrate the ambient air introduced into the housing; and an adsorbent disposed on the side of the outlet from the filter element so as to oppose to the filter element and configured to adsorb an evaporated fuel invaded inside the housing through the outlet, wherein the adsorbent includes an adsorbing material adsorbing the evaporated fuel and a pair of non-woven fabrics sandwiching the adsorbent material from both sides thereof, and at least one of the non-woven fabrics disposed on the outlet side has an amount of METSUKE of 30-500 $g/m^2$. An amount of METSUKE is the weight per unit areas of non-woven fabrics.

In a further aspect of the present invention, there is also provided an air cleaner comprising:

a housing having an inlet for ambient air is introduced into the housing therethrough and an outlet for a filtrated air is discharged out of the housing therethrough;

a filter element disposed in the housing so as to separate the inside thereof into an inlet side section and an outlet side section and configured to filtrate the ambient air introduced into the housing; and an adsorbent disposed on the side of the outlet from the filter element so as to oppose to the filter element and configured to adsorb an evaporated fuel invaded inside the housing through the outlet, wherein the adsorbent includes an adsorbing material adsorbing the evaporated fuel and a pair of non-woven fabrics sandwiching the adsorbent material from both sides thereof, and at least one of the non-woven fabrics disposed on the outlet side is impregnated with either one of phenol resin, epoxy resin, or urethane resin.

In a still further aspect of the present invention, there is also provided an air cleaner comprising:

a housing having an inlet for ambient air is introduced into the housing therethrough and an outlet for a filtrated air is discharged out of the housing therethrough;

a filter element disposed in the housing so as to separate the inside thereof into an inlet side section and an outlet side section and configured to filtrate the ambient air introduced into the housing; and an adsorbent disposed on the side of the outlet from the filter element so as to oppose to the filter element and configured to adsorb an evaporated fuel invaded inside the housing through the outlet, wherein the adsorbent includes an adsorbing material adsorbing the evaporated fuel and a pair of non-woven fabrics sandwiching the adsorbent material from both sides thereof, and a resin binder is adhered to at least one of the non-woven fabrics disposed on the outlet side at 20-50 weight % with respect to fiber weight.

In the air cleaner of the above respective aspects, it may be desired that at least one of the non-woven fabrics disposed on the outlet side is formed so as to have a plurality of layers of non-woven fabrics laminated by a spunbonding method in which fused polymer is spun through a nozzle.

In a still further aspect of the present invention, there is also provided an air cleaner comprising:

a housing having an inlet for ambient air is introduced into the housing therethrough and an outlet for a filtrated air is discharged out of the housing therethrough;

a filter element disposed in the housing so as to separate the inside thereof into an inlet side section and an outlet side section and configured to filtrate the ambient air introduced into the housing; and an adsorbent disposed on the side of the outlet from the filter element so as to oppose to the filter element and configured to adsorb an evaporated fuel invaded inside the housing through the outlet, wherein the adsorbent includes an adsorbing material adsorbing the evaporated fuel and a pair of non-woven fabrics sandwiching the adsorbent material from both sides thereof, and at least one of the non-woven fabrics disposed on the outlet side is formed so as to have a plurality of layers of non-woven fabrics laminated by a spunbonding method in which fused polymer is spun through a nozzle.

According to the present invention of the aspects mentioned above, the strength and rigidity of the adsorbent disposed in the housing can be improved. More specifically, the strength and rigidity thereof may be improved by (1) providing a reinforcing material, (2) increasing an amount of METSUKE, (3) using phenol resin, epoxy resin or urethane resin as resin binder, (4) increasing weight ratio of the resin binder with respect to fiber weight, or (5) laminating non-woven fabrics formed by a spunbonding method, for at least one of the non-woven fabrics, i.e., non-woven fabric disposed on the outlet side of the housing (downstream side of an introduced air flow). Thus, the air flow can be made stable without being disturbed and free from breakage of the adsorbent, thus maintaining well running condition of the internal combustion engine.

The nature and further characteristic features are made clearer from the following descriptions made with reference to the accompanying drawings.

DESCRIPTION OF THE PREFERRED EMBODIMENT

Preferred embodiments of the present invention will be described hereunder with reference to the accompanying drawings.

Figure 1:
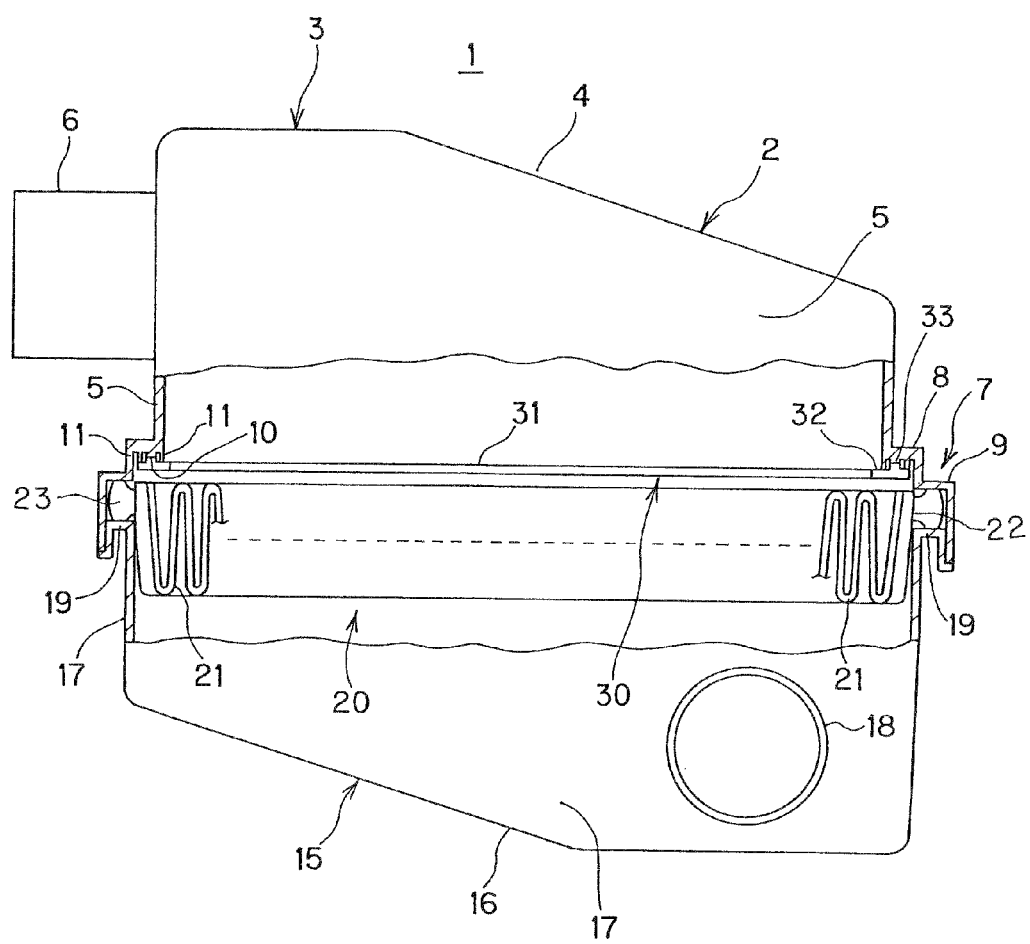
FIG. 1 is a partially sectional side view illustrating an inner structure of an air cleaner according to one embodiment of the present invention.

Referring to FIG. 1, an air cleaner 1 of the present invention is used by connecting to an intake system of an internal combustion engine, for example, and an ambient air sucked into the internal combustion engine is filtrated to remove impure substances and a filtrated air is supplied to the engine.

The illustrated air cleaner 1 is provided with a housing 2 forming an outer case thereof, and inside the housing 2, there are disposed a filter element 20 for filtrating introduced air and an adsorbent unit 30 for adsorbing an evaporated fuel generated in the housing 2.

The housing 2 includes a cover 3 forming an upper half section of the air cleaner 1 and a case 15 forming a lower half section thereof. The cover 3 is composed of an upper (top) surface portion 4, a peripheral (side) surface portion 5, and a lower (bottom) opened portion. On the other hand, the case 15 is composed of a lower (bottom) surface portion 16, a peripheral (side) surface portion 17 and an upper (top) opened portion.

The case 15 includes an air inlet 18 formed to the side surface portion 17, as a projected tubular member, through which an ambient air is introduced into the case 15, and the cover 3 includes an air outlet 6 formed to the side surface portion 5, as a tubular member, through which a filtrated air is discharged to the engine.

The opened portions of the cover 3 and the case 15 are formed with flanged portions 7 and 19, respectively, and the cover 3 and the case 15 constitute the housing 2 by detachably mating and engaging these flanged portions 7 and 19 together.

The flanged portion 7 formed to the cover 3 has a two-stepped structure including a first inside stepped portion and second outside stepped portion. The first inside stepped portion is formed as a mount portion 8 to which the adsorbent unit 30 is mounted as mentioned hereinafter, and the second outside stepped portion is formed as a mount portion 9 to which the filter element 20 is mounted.

The filter element 20 includes a folded filtrating member 21, a frame 22 disposed so as to surround the filtrating member 21 to hold the same and a packing 23 disposed so as to entirely surround the outer surface of the frame 22. The filter element 20 is disposed inside the housing 2 so as to be sandwiched between the case 15 and the cover 3. According to the location of this filter element 20, the inside of the housing 2 is sectioned into the case side as dust side and the cover side as clean side.

The frame 22 is disposed, as shown in FIG. 1, to the mount portion 9 positioned on the outer end side of the cover 3 so as to sandwich the packing 23 formed to the outer peripheral portion of the filter element 20 between the mount portion 9 and the flanged portion 19 formed to the opened end side of the case 15. In this arrangement, the sealing to the inside of the housing 2 is performed at the mating portion between the case 15 and the cover 3 by sandwiching the packing 23 between the mount portion 9 and the flanged portion 19 of the case 15.

The adsorbent unit 30 has a plate-shaped structure and is composed of an adsorbent 31 including an adsorbent material 35 (FIG. 2) and a resin frame 32 disposed so as to surround the adsorbent 31 to hold the same. The adsorbent unit 30 is integrated with the cover 3 by fusing the frame 32 forming the peripheral edge portion of the adsorbent unit 30 to the mount portion 8 forming the first stepped portion of the flanged portion 7 of the cover 3. In the air cleaner 1 of the present embodiment, the adsorbent unit 30 is fused to the mount portion 8 of the cover 3 by means of vibration fusing.

As shown in FIG. 1, the mount portion 8 of the cover 3 is formed with a fusing projection 10, and another fusing projection 33 is also formed to one surface of the frame 32. These projections 10 and 33 abut against each other, and the adsorbent unit 30 is vibrated with respect to the cover 3 in the abutting state of both the projections 10 and 33. Both the projections 10 and 33 are then fused by a friction heat generated therebetween, and hence, the frame 32 of the adsorbent unit 30 is fused to the mount portion 8 of the cover 3.

Furthermore, wall sections 11, 11 extending in parallel with the fusing projection 10 at the inside and outside thereof are formed to the mount portion 8 of the cover 3 so as to direct to the frame 32 of the adsorbent unit 30. These wall sections 11, 11 are formed along the entire periphery of the cover 3, and serve as a bar to prevent splashing of burr generated from the fusing projections 10 and 33 at the time of vibration fusing thereof.

Further, the method of fixing the adsorbent unit 30 to the cover 3 is not limited to the vibration fusing method, and any other method such as ultrasonic fusing method or other fusing methods may be adopted. In addition, the adsorbent unit 30 may be mounted to the cover 3 by means or methods other than the above-mentioned fixing method. For example, a plurality of projections are formed to the mount portion 8 of the cover 3, and through holes are formed to the frame 32 of the adsorbent at positions corresponding to the projections formed to the cover 3. The projections are inserted into the through holes, and after the insertion, head portions of the projections projecting over the frame are crushed to thereby mount the adsorbent 30 to the cover 3.

Figure 2:
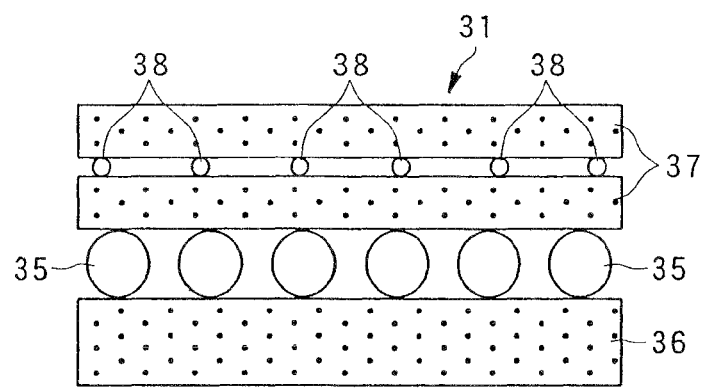
FIG. 2 is an illustrated view representing one example of an adsorbent used for the air cleaner.

The adsorbent 31 of this adsorbent unit 30 has a structure shown in FIG. 2.

With reference to FIG. 2, the adsorbent 31 is provided with an adsorbing material or member 35 and non-woven fabrics 36 and 37 disposed so as to sandwich the adsorbing material 35 from both sides thereof. Further, in the illustration of FIG. 2, an upper side constitutes the outlet side 6 forming the downstream side of the sucked and introduced air flow and a lower side faces the filter element 20 forming the upstream side of the introduced air flow.

As the adsorbing material 35, activated carbon in form of particle, carbon fiber, porous material and so on may be utilized. The adsorbing material 35 is uniformly distributed on the entire surfaces of the non-woven fabrics 36 and 37 when the adsorbing material 35 is sandwiched therebetween. One of the non-woven fabrics 36 disposed on the upstream side of the air flow (lower side in FIG. 2) is formed of a general filtering material, and on the other hand, the other one of the non-woven fabrics 37 disposed on the downstream side (upper side in FIG. 2) is provided with a reinforcing member 38, which is integrated with the non-woven fabric 37 by means of needle punch method.

The reinforcing member 38 may include a structure in which a plurality of ribs are arranged in parallel with each other, or a structure in which a plurality of ribs are arranged vertically and horizontally so as to cross in lattice shape with each other. In addition, the reinforcing member 38 may be formed of polypropylene, glass fiber, nylon, or steal material. However, the material constituting the reinforcing member 38 is not limited to these ones in their structures or materials as far as it improves the strength and rigidity of the non-woven fabric 37 disposed on the downstream side of the air flow, and a structure in which a plurality of through holes are formed to a plate member may be utilized, or a structure in which the ribs are crossed so as to provide a plurality of diamond shapes may be also utilized. Furthermore, a resin material may be also utilized.

As mentioned above, since the non-woven fabric 37 disposed on the downstream side of the air flow is provided with the reinforcing member 38, the non-woven fabric 37 can be improved in its strength and rigidity, and as a result, the strength and rigidity of the entire structure of the adsorbent unit 30 are improved. Thus, the bowing of the adsorbent 31 of the adsorbent unit 30 can be effectively prevented from causing, and in addition, the breakage thereof can be also effectively prevented.

Further, when the reinforcing member 38 is provided inside the non-woven fabric 37 disposed downstream side in the air flow, the reinforcing member 38 may be fixed inside the non-woven fabric 37 by means of bonding agent as well as confounding of the non-woven fabric 37 to the reinforcing member 38 by the needle-punch method. In such manner, the strength and rigidity of the entire structure of the adsorbent 31 may be improved even in this structure of the non-woven fabric 37 disposed downstream side in the air flow.

When it is required to further improve the strength and rigidity of the adsorbent 31, it may be preferred to use the non-woven fabrics, in which the reinforcing members 38 are disposed, so as to sandwich the adsorbing material 35 therebetween.

Figure 3:
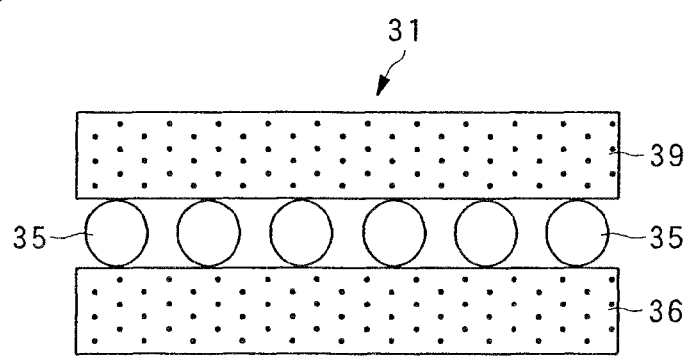
FIG. 3 is an illustrated view representing another example of an adsorbent used for the air cleaner.

FIG. 3 represents an adsorbent for the adsorbent unit 30, which has a structure different from the structure of the adsorbent 31 shown in FIG. 2 for improving the strength and rigidity thereof.

With reference to FIG. 3, this adsorbent 31 is formed by sandwiching the adsorbing material 35 between the non-woven fabrics 36 and 39. The adsorbing material 35 is formed from particles of activated carbon, which is uniformly dispersed on the entire surfaces of the non-woven fabrics 36 and 39 between which the adsorbing material is sandwiched.

The adsorbing material 35 disposed on the upstream side of the air flow, i.e., on the lower side in FIG. 3, is formed of a fabric generally utilized as filtrating material, and on the other hand, the other non-woven fabric 39 disposed on the downstream side of the air flow is rich in an amount of METSUKE of the filtrating material in comparison with the non-woven fabric 36 utilized for the general filtrating material. That is, the non-woven fabric 36 disposed upstream side has an amount of METSUKE of the filtrating material of less than 30 $g/m^2$, and on the contrary, the non-woven fabric 39 disposed downstream side has an amount of METSUKE of the filtrating material in a range of 30-500 $g/m^2$. As mentioned, by increasing the amount of METSUKE of the filtrating material, density of fiber of the downstream-side non-woven fabric 39 increases, and the strength and rigidity thereof are increased by the amount corresponding to the increased amount of METSUKE. Further, by forming the non-woven fabric 39 so that the upper limit of the amount of METSUKE of the filtrating material is almost of 500 $g/m^2$, the smooth air flow can be ensured without largely increasing resistance against the air flow of the adsorbent 31.

Further, with the adsorbent 31 shown in FIG. 3, the non-woven fabric having the amount of METSUKE of the filtrating material of 30-500 $g/m^2$ may be utilized for the upstream-side non-woven fabric as well as the downstream-side non-woven fabric.

As a method of increasing the strength and rigidity of the non-woven fabric, the non-woven fabric may be formed by using phenol resin, epoxy resin or urethane resin in place of acrylic resin using resin binder. In the use of such resin material as resin binder, the strength and rigidity of the non-woven fabric may be further increased.

Particularly, since the epoxy resin has a high bonding performance, if it is used for a portion constituting an air path of an air cleaner 1 as a resin binder, the epoxy resin will never be separated from the non-woven fabric 36.

Furthermore, as a method of increasing the strength and rigidity of the non-woven fabric by regulating the resin binder, there may be proposed a method of increasing an amount of the resin binder to be adhered to the non-woven fabric more than that in a usual case.

In general, the acrylic resin is used as the resin binder, and in the case where the acrylic resin is used as the resin binder, the resin binder is adhered to the non-woven fabric at a weight ratio of 10 to 15% with respect to the weight of the fiber. On the other hand, by adhering the resin binder to the non-woven fabric at the weight ratio of 20 to 50%, the strength and rigidity of the non-woven fabric can be increased. Moreover, when the upper limit of the weight ratio to the fiber weight is set to about 50%, a gap to be formed inside the non-woven fabric can be maintained, thus permitting the smooth air flow.

Figure 4:
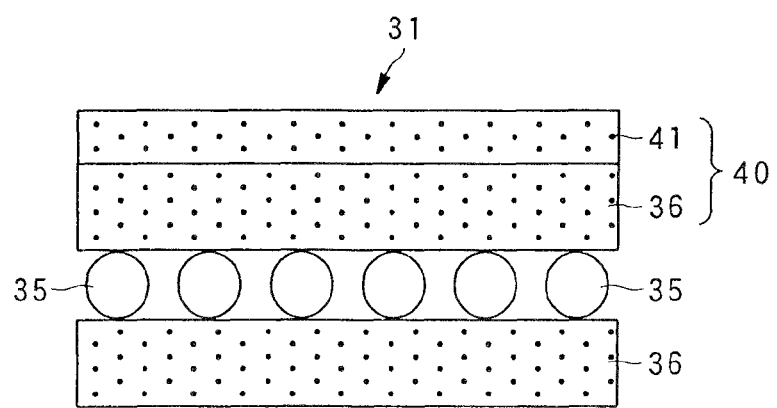
FIG. 4 is an illustrated view representing a further example of an adsorbent used for the air cleaner.

Still furthermore, in order to improve the strength and rigidity of the entire structure of the adsorbent 31 of the adsorbent unit 30, the adsorbing material 35 may have a structure shown in FIG. 4.

In the adsorbent unit 31 shown in FIG. 4, the adsorbing material 35 is sandwiched between the non-woven fabrics 36 and 40, and at least one of these non-woven fabrics 40 disposed on the downstream side, i.e., outlet side, of the air flow is formed into two layers. In this structure, particle activated carbon is used for the adsorbing material 35, and the adsorbing material 35 is uniformly dispersed on the entire surfaces of the non-woven fabrics 36 and 40 sandwiching the adsorbing material 35. Further, as the paired non-woven fabrics 36 directly sandwiching the adsorbing material 35, a generally used one may be used.

In this adsorbent 31, the non-woven fabric 40 disposed on the outlet side 6 includes another non-woven fabric 41 formed by a spunbonding method on the outside of the general non-woven fabric 36 so as to constitute the laminated non-woven fabric 40. The spunbonding method is a method of spinning fiber of fused non-woven fabric at a high speed from a nozzle and piling and collecting the spun fiber into a sheet or web. The thus formed sheet or web may be further press-fitted under heating.

The thus laminated non-woven fabric 40 includes the non-woven fabric 36 and the other non-woven fabric 41 formed on one surface of the non-woven fabric 36 by the spunbonding method, which are laminated and then press-fitted while heating. The adsorbent 31 is formed by sandwiching the adsorbing material 35 between such laminated non-woven fabric 40 and single layer of non-woven fabric 36, and in this process, the non-woven fabric 41 formed by the spunbonding method constitutes an outer layer of the laminated non-woven fabric 40. However, this non-woven fabric 41 may be disposed on the inside of the laminated non-woven fabric 40. Furthermore, the usual non-woven fabric 36 and the non-woven fabric 41 formed by the spunbonding method may be overlapped and then bonded together by means of bonding agent.

The thus formed adsorbent unit 30 including the adsorbent 31 is arranged in the housing in such a manner that the laminated non-woven fabric 40 is directed to the outlet side (downstream side) 6 of the air cleaner 1. However, the adsorbent 31 may be formed by a pair of laminated non-woven fabrics 40 between which the adsorbing material 35 is sandwiched.

In the embodiment shown in FIG. 4, an example in which the non-woven fabric 41 formed by the spunbonding method is laminated to the generally used non-woven fabric 36 was described, the method of applying the laminated layers of the non-woven fabric 40 formed by the spunbonding method to the adsorbent 31 may be applicable to the adsorbent 31 shown in FIG. 2 in which the reinforcing member 38 is provided, the adsorbent 31 shown in FIG. 3 in which the amount of METSUKE of the filtrating material is increased and the adsorbent 31 in which the phenol resin, or epoxy resin is used as the resin binder to thereby increase the weight ratio of the resin binder with respect to the fiber.

Furthermore, although FIGS. 2, 3 and 4 represent the respective examples of the adsorbent of the air cleaner according to the present invention, the combinations thereof, other than the above, may be applicable for the present invention.

That is, it is to be noted that the present invention is not limited to the described embodiments and many other changes and modifications may be made without departing from the scopes of the appended claims, for example, as mentioned above.

What is claimed is:

1. An air cleaner comprising:
   a housing having an inlet for ambient air is introduced into the housing therethrough and an outlet for a filtrated air is discharged out of the housing therethrough;
   a filter element disposed in the housing so as to separate the inside thereof into an inlet side section and an outlet side section and configured to filtrate the ambient air introduced into the housing; and
   an adsorbent disposed on the side of the outlet from the filter element so as to oppose to the filter element and configured to adsorb an evaporated fuel invaded inside the housing through the outlet,
   wherein the adsorbent includes an adsorbing material adsorbing the evaporated fuel and a pair of non-woven fabrics sandwiching the adsorbent material from both sides thereof, and at least one of the non-woven fabrics disposed on the outlet side includes two non-woven fabric layers between which a reinforcing material is sandwiched so as to be integrated with the non-woven fabric, and
   wherein the reinforcing material is a structure in which a plurality of ribs are arranged vertically and horizontally so as to cross in lattice shape with each other.

2. The air cleaner according to claim 1, wherein at least one of the non-woven fabrics disposed on the outlet side is formed so as to have a plurality of layers of non-woven fabrics laminated by a spun bonding method in which fused polymer is spun through a nozzle.

3. An air cleaner comprising:
   a housing having an inlet for ambient air introduced into the housing and an outlet for a filtrated air discharged out of the housing;
   a filter element disposed in the housing comprised of an inlet side section and an outlet side section, the filter element configured to filtrate the ambient air introduced into the housing; and
   an adsorbent disposed on the outlet side section so as to oppose to the filter element, the adsorbent configured to adsorb an evaporated fuel invaded inside the housing through the outlet,
   the adsorbent comprised of a pair of non-woven fabrics and an adsorbent material sandwiched between the pair of non-woven fabrics,
   a first of the pair of non-woven fabrics being disposed on an upstream side of the air flow and being formed of a filtering material,
   a second of the pair of non-woven fabrics being disposed on the downstream side and being formed of two non-woven fabric layers with a reinforcing material sandwiched therebetween,
   the reinforcing member having a structure in which a plurality of ribs are arranged vertically and horizontally so as to cross in lattice shape with each other.

* * * * *